(12) United States Patent
Lancuba

(10) Patent No.: US 12,422,368 B2
(45) Date of Patent: Sep. 23, 2025

(54) SYSTEMS AND METHODS FOR PERFORMING LASER-INDUCED BREAKDOWN SPECTROSCOPY

(71) Applicant: THERMO FISHER SCIENTIFIC (ECUBLENS) SARL, Ecublens (CH)

(72) Inventor: Patrick Lancuba, Fitchburg, WI (US)

(73) Assignee: Thermo Fisher Scientific (Ecublens) SARL, Ecublens (CH)

( * ) Notice: Subject to any disclaimer, the term of this patent is extended or adjusted under 35 U.S.C. 154(b) by 259 days.

(21) Appl. No.: 18/245,130

(22) PCT Filed: Aug. 3, 2021

(86) PCT No.: PCT/EP2021/071641
§ 371 (c)(1),
(2) Date: Mar. 13, 2023

(87) PCT Pub. No.: WO2022/053229
PCT Pub. Date: Mar. 17, 2022

(65) Prior Publication Data
US 2023/0366825 A1 Nov. 16, 2023

(30) Foreign Application Priority Data
Sep. 14, 2020 (GB) .................................. 2014419

(51) Int. Cl.
*G01N 21/71* (2006.01)

(52) U.S. Cl.
CPC . *G01N 21/718* (2013.01); *G01N 2201/06113* (2013.01); *G01N 2201/0636* (2013.01)

(58) Field of Classification Search
CPC .......... G01J 3/021; G01J 3/2803; G01J 3/443; G01N 21/718; G01N 2201/06113; G01N 2201/0636; G01N 1/04; G01N 2001/045
See application file for complete search history.

(56) References Cited

U.S. PATENT DOCUMENTS

| 5,815,198 A | * | 9/1998 | Vachtsevanos | ......... G06T 7/001 |
| | | | | 348/125 |
| 2017/0247797 A1 | | 8/2017 | Zhou et al. | |
| 2019/0271652 A1 | * | 9/2019 | Zhao | .................... G01N 21/718 |

FOREIGN PATENT DOCUMENTS

| CN | 105973871 B | 4/2019 |
| JP | 2013019900 A | 1/2013 |
| JP | 2016213189 A | 12/2016 |
| WO | WO-2015077867 A1 | 6/2015 |
| WO | WO-2017006233 A1 | 1/2017 |
| WO | WO-2017037680 A1 | 3/2017 |

OTHER PUBLICATIONS

PCT/EP2021/071641, International Search Report and Written Opinion, Oct. 21, 2021, 13 Pages.

* cited by examiner

*Primary Examiner* — Tri T Ton

(57) ABSTRACT

A method for compositional analysis includes providing a sample having a surface, moving an ablation point to a plurality of positions on the surface along a fractal path, pulsing an energy source to provide an electromagnetic energy beam to ablate material at the ablation point, collecting an emission spectrum in response to pulsing the energy source, and analyzing the emission spectrum to determine a composition at the surface.

20 Claims, 11 Drawing Sheets

SYSTEMS AND METHODS FOR PERFORMING LASER-INDUCED BREAKDOWN SPECTROSCOPY

CROSS-REFERENCE TO RELATED APPLICATIONS

This application is a U.S. 371 of International Application No. PCT/EP2021/071641 filed Aug. 3, 2021, which claims priority to United Kingdom Application No. GB2014419.2 filed Sep. 14, 2020, which disclosures are herein incorporated by reference in their entirety.

FIELD OF THE DISCLOSURE

This disclosure in general relates to systems and methods for performing laser-induced breakdown spectroscopy.

BACKGROUND

Elemental analysis techniques aid in determining the elemental composition of a material in various forms. Elemental analysis techniques range from destructive (e.g., material is destroyed in testing) to semi-destructive (e.g., material is sampled or surface damaged) to fully non-destructive (e.g., material is left fully intact). Example techniques can include Inductively Coupled Plasma-Atomic Emission Spectroscopy (e.g. ICP-AES), ICP-Mass Spectrometry (e.g. ICP-MS), Electrothermal Atomization Atomic Absorption Spectroscopy (e.g. ETA-AAS), X-Ray Fluorescence Spectroscopy (e.g. XRF), X-Ray Diffraction (e.g. XRD), and Laser-induced Breakdown Spectroscopy (e.g. LIBS). Elemental analysis may be either qualitative or quantitative and often requires calibration to known standards.

Laser-induced breakdown spectroscopy (LIBS) is an analytical technique used to analyze a large variety of materials, including metals, polymers, glasses, ceramics, and minerals. LIBS can very accurately detect and quantify elements of the periodic table. It can perform analysis of large and small samples, requires little-to-no sample preparation, and can be used for both bulk elemental analysis and microscanning for imaging. LIBS relies on pulsed energy emissions, such as pulsed laser emission, directed toward the sample to ablate, atomize, and ionize matter. The impact of each laser pulse onto the sample's surface creates a plume of plasma, light from which can be analyzed to perform qualitative and quantitative spectroscopy measurements. LIBS can therefore provide an easy to use, rapid, and in-situ chemical analysis with high precision, detection limits, and low cost.

Laser interactions with matter are governed by quantum mechanics which describe how photons are absorbed or emitted by atoms. If an atom absorbs a photon one or more electrons move from a ground state to a higher energy quantum state. Electrons tend to occupy the lowest possible energy levels, and in the cooling/decay process, the atom emits a photon to return to a lower energy level. The different energy levels of different atoms produce different photon energies for each kind of atom, with narrowband emissions due to their quantization. These emissions correspond to the spectral emission lines found in LIBS spectra.

There are three basic stages in the plasma lifetime. The first stage is the ignition process which includes the initial bond breaking and plasma formation during the laser pulse. This is affected by the laser type, laser power, and pulse duration. The second stage in plasma life is the most critical for optimization of LIBS spectral acquisition and measurement because the plasma causes atomic emission during the cooling process. After ignition, the plasma will continue expanding and cooling. At the same time, the electron temperature and density will change. This process depends on ablated mass, spot size, energy coupled to the sample, and environmental conditions (state of the sample, pressure, etc.).

The last stage of the plasma life is less useful for LIBS measurements. A quantity of ablated mass is not excited as vapor or plasma; hence this amount of material is ablated as particles and these particles create condensed vapor, liquid sample ejection, and solid sample exfoliation, which do not emit radiation. Moreover, ablated atoms become cold and create nanoparticles in the recombination process of plasma.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an embodiment, a system for compositional analysis includes an energy source to provide an energy beam directed at an ablation point on a surface of a sample. The energy source can, for example, be a laser. The ablation point can be moved to positions on the surface sequentially along a fractal path. In an example, the positions can be disposed in a grid or array of positions. In an example, the fractal path is derived from a fractal pattern. The fractal pattern can be a curve-filling fractal pattern, such as an isotropic curve-filling fractal pattern. The system can include a controller that directs the movement of the ablation point to the positions along the fractal path. The system can further include lenses and mirrors, or optionally, linear stage platforms to facilitate movement of the ablation point. The energy beam ablates material from the surface of the sample at the ablation point. The ablated material evolves an emission spectrum. The system can include a collection system to collect the emission spectrum. In an example, the collection system includes a collection lens optically connected to a spectral analyzer or spectrometer to determine the wavelengths emitted by the ablated material. The system can use the emission spectrum to determine which elements are present and optionally, in what quantities.

In a further example, a method for compositional analysis includes providing a sample having a surface. At each position sequentially along a fractal path, material is ablated from the surface at the position, an emission spectrum is collected, and the emission spectrum is analyzed to determine a composition at the surface, optionally wherein the emission spectrum is converted to a digital signal for further analysis to determine the composition. The compositions can be analyzed, such as through averaging, to determine an average surface composition. In another example, compositions at positions can be used to form an image or map of positionally-resolved compositions.

It has been discovered that conventional scanning methods leave artifacts when displayed as a positionally-resolved image or map. Such artifacts can appear as blurring or smearing on the image. In particular, the presence of such artifacts brings into question both the accuracy of an image and the accuracy of any average derived from composition measurements. It is believed that these artifacts are caused by previously ejected material, and it has been discovered that these conventional scanning methods exacerbate the blurring problems because of a strong material transport effect when moving the pulsed laser in a single direction. In contrast, it is been discovered that the use of a fractal path traversing positions on a surface reduces the effect of material transport, and in particular, removes the appearance of artifacts such as blurring or smearing.

Figure 1:
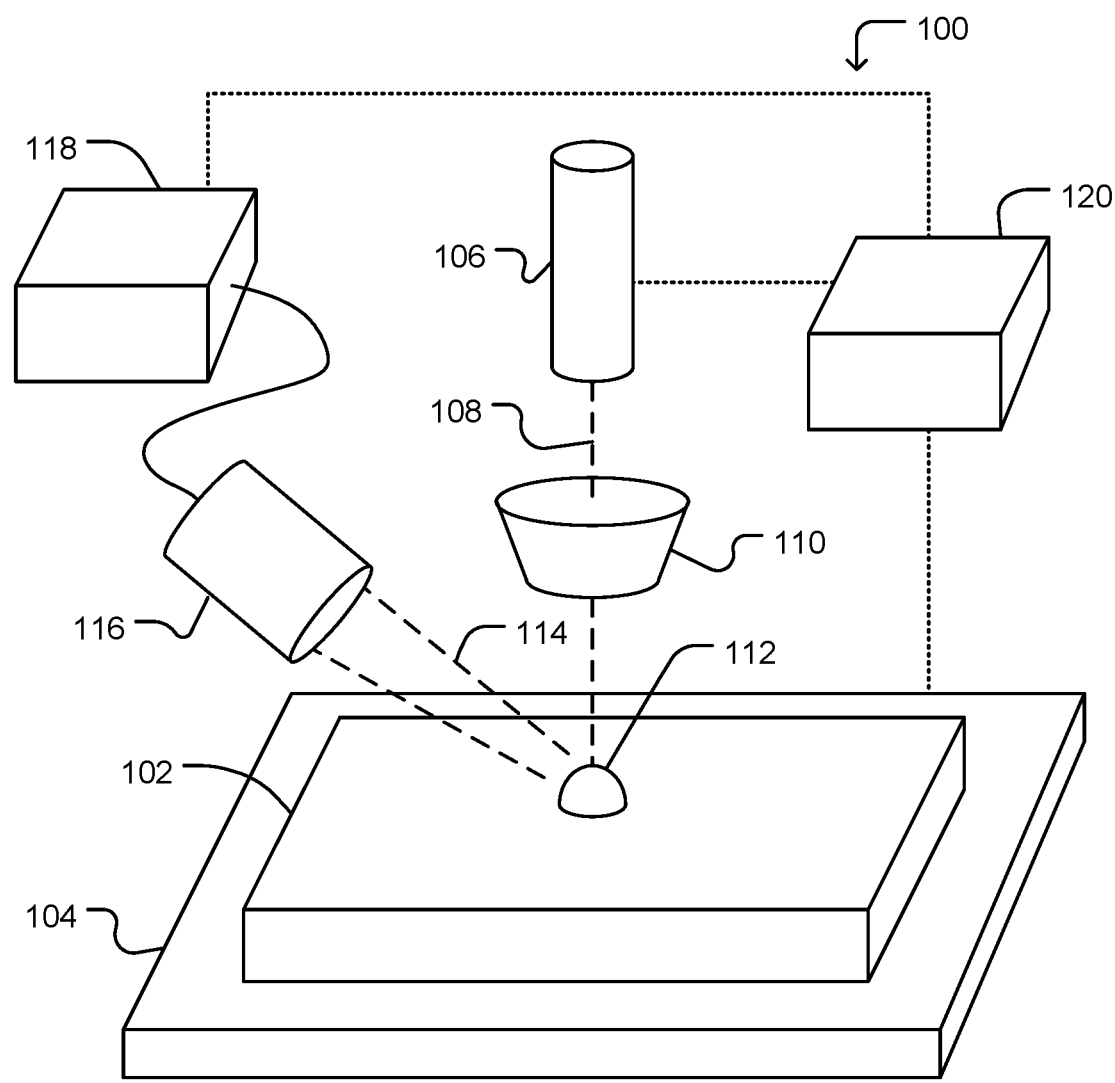
FIG. 1 and FIG. 2 include illustrations of example laser-induced breakdown spectroscopy systems.

FIG. 1 includes a schematic illustration of a system 100 for performing compositional analysis, for example, through laser-induced breakdown spectroscopy. A sample 102 is placed on a platform 104. An energy source 106 directs an energy beam 108 through optical systems, such as lenses 110, at an ablation point 112 positioned on the surface of the sample 102. Material is ablated from the surface of the sample 102 and at least a portion of the ablated material is atomized or ionized, resulting in an emission spectrum 114 that is collected by a collection lens 116 optically connected to a spectrometer 118, for example, using a fiber-optic cable.

The energy source 106 can include or can be a laser. In an example, the energy source can be a pulsed laser having a typical wavelength in a range of 200 nm to 1100 nm, such as 1064 nm, 532 nm, or 266 nm. Further, the energy source can have a peak power in a range of 0.5 MW/cm$^2$ to 2 GW/cm$^2$, such as at least 1 MW/cm$^2$, sufficient for ablating material from a surface of a sample and to probe elemental composition. For example, the laser pulses can have an energy in a range of 100 µJ-100 mJ and a pulse width in the femtosecond, picosecond or nanosecond regime with a pulse repetition rate of up to the MHz regime. The laser may be a mode-locked or Q-switched laser. For example, the laser may be a passive Q-switched or an active Q-switched laser.

Lens 110 can include a spherical lens, a flat-field scanning lens, e.g., an F-tan(θ) scanning lens, or an F-Theta scanning lens. In particular, the lens 110 is an F-Theta scanning lens.

The collection system can include the collection lens 116 and a spectrometer 118. In an example, spectrometer includes an imaging apparatus, such as a charge coupled device (CCD) imaging apparatus.

In particular, the system 100 includes a controller 120. In an example, the controller 120 can control the relative movement of the ablation point 112 to positions on the surface of the sample 102. For example, the controller 120 can control a linear stage translation table, such as platform 104, to move the sample 102 relative to a fixed beam 108. In another example, mirrors such as galvo mirrors, prisms, or lenses can be used to alter the relative position of the ablation point on a fixed sample. The controller 120 can control the relative movement of the ablation point 112 to positions on the surface of the sample 102 sequentially along a fractal path. From the collection of the emission spectrum at each position on the surface of the sample 102, it is possible to construct a compositional map of the scanned surface.

The controller 120 can further control the timing of the laser 106 to ablate material only at the desired positions on the sample surface. Further, the controller 120 can control the collection system, such as the spectrometer 118, to collect the emission spectrum at a time delayed from the activation of the laser 106.

Figure 2:
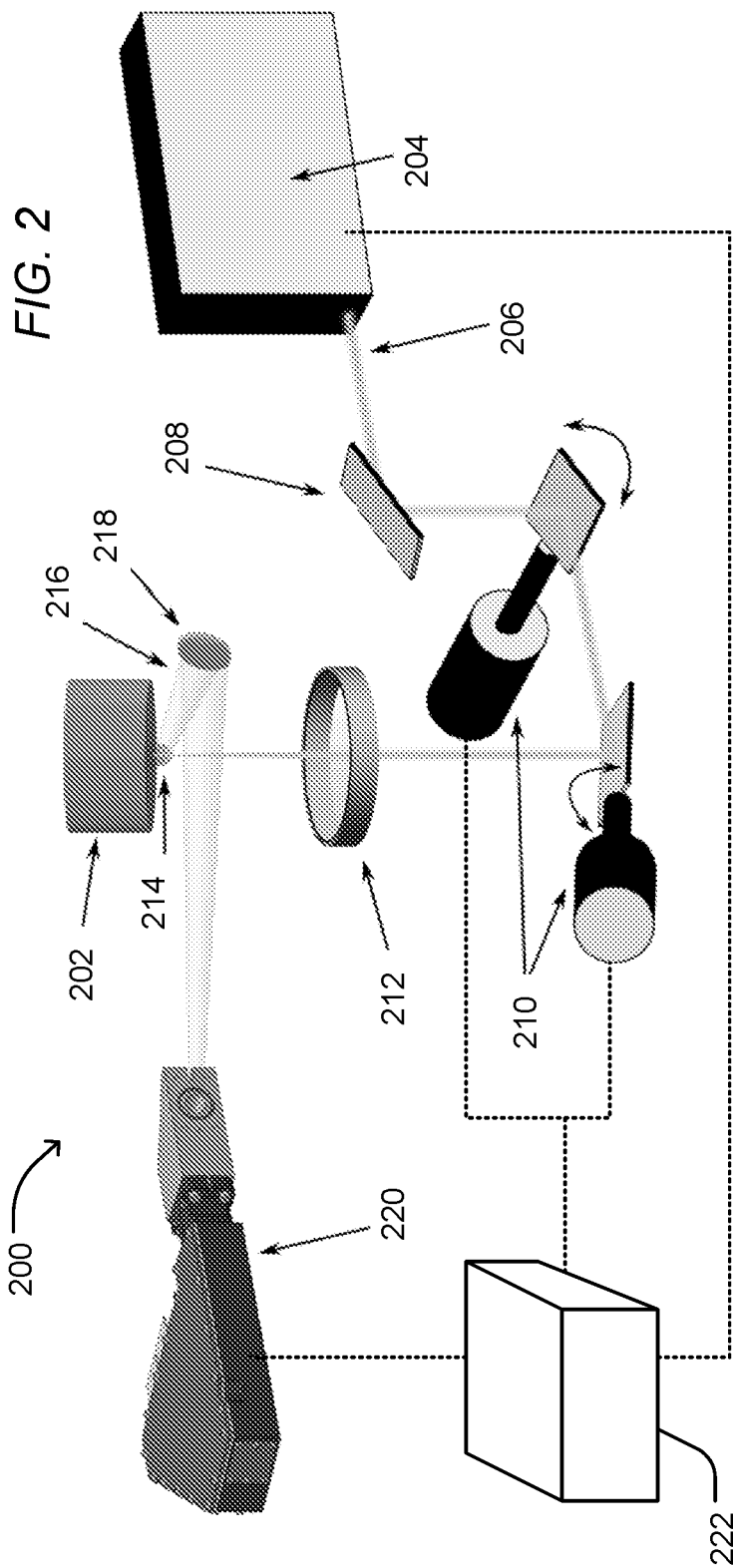

In another example, FIG. 2 illustrates schematically a system 200 for performing compositional analysis. The system 200 includes electromagnetic energy source 204 that emits an electromagnetic energy beam 206. A set of one or more fixed mirrors 208 and movable positioning mirrors, such as galvo mirrors 210, can direct the electromagnetic energy beam through lens 212 to ablation point 214 on the surface of the sample 202. In an example, the mirrors 210, which are motor driven, can be adjusted automatically to guide the ablation point to positions disposed sequentially along a fractal path on the surface of the sample 202. Lens 212 can be a spherical lens, flat field scanning lens, or an F-Theta scanning lens. In an example, the lens 212 is a flat field scanning lens or an F-Theta scanning lens. In particular, the lens 212 is an F-Theta scanning lens.

When material is ablated by the electromagnetic energy beam 206 at ablation point 214, an emission spectrum 216 is evolved. The emission spectrum 216 can be directed by one or more mirrors 218 to a spectrometer 220.

In an example, the electromagnetic energy source 204 is a laser. In an example, the energy source in 204 can be a pulsed laser having a typical wavelength in a range of 200 nm to 1100 nm, such as 1064 nm, 532 nm, or 266 nm. Further, the energy source can have a peak power in a range of 0.5 MW/cm$^2$ to 2 GW/cm$^2$, such as at least 1 MW/cm$^2$, sufficient for ablating material from a surface of a sample and to probe elemental composition. For example, the laser pulses can have an energy in a range of 100 µJ-100 mJ and a pulse width in the femtosecond, picosecond or nanosecond regime with a pulse repetition rate of up to the MHz regime. The laser may be a mode-locked or Q-switched laser. For example, the laser may be a passive Q-switched or an active Q-switched laser.

The spectrometer 220 can include various optical components such as one or more mirrors, lenses, apertures, gratings, prisms, and emission collection apparatuses. In an example, the emission collection apparatus is a charge coupled device (CCD) apparatus. In other examples, other emission detectors can be employed.

The system 200 can include a controller 222. In an example, the controller 222 controls the adjustable mirrors 210 to adjust the position on the surface of the sample 202 at which the ablation point 214 is located. In particular, the controller 222 is configured to move the ablation point to positions disposed sequentially along a fractal path, for example by controlling motors that drive the adjustable mirrors 210. Further, the controller 222 can control the activation of the energy source 204 and can control the time at which the spectrometer 220 collects or analyzes emission spectra.

The controller 222 can comprise a computer (not shown): for example, comprising a storage medium, a memory, a processor, one or more interfaces, such as a user output interface, a user input interface, and a network interface, which are linked together. The storage medium may be any form of non-volatile data storage device such as one or more of a hard disk drive, a magnetic disc, an optical disc, a ROM, etc. The storage medium may store one or more computer programs for causing the controller 222 to adjust the position on the surface of the sample 202 at which the ablation point 214 is located. The memory may be any random access memory suitable for storing data or computer programs. The processor may be any processing unit suitable for executing one or more computer programs (such as those stored on the storage medium or in the memory). The processor may comprise a single processing unit or multiple processing units operating in parallel, separately or in cooperation with each other. The processor, in carrying out processing operations, may store data to or read data from the storage medium or the memory. An interface may be provided that is any unit for providing an interface between the computer and the movable mirrors 210 and the energy source 204. A user input interface may be arranged to receive input from a user, or operator. The user may provide this input via one or more input devices of the controller, such as a mouse (or other pointing device) or a keyboard, that are connected to, or in communication with, the user input interface. However, it will be appreciated that the user may provide input to the computer via one or more additional or alternative input devices (such as a touch screen). The computer may store the input received from the input devices via the user input interface in the memory for the processor to subsequently access and process, or may pass it straight to the processor, so that the processor can respond to the user input accordingly. A user output interface may be arranged to provide a graphical/visual output to a user, or operator. For example, the emission spectrum collected from the sample may be provided as a graphical/visual output to a user, or operator. As such, the processor may be arranged to instruct the user output interface to form an image/video signal representing a desired graphical output, and to provide this signal to a video display unit (VDU) such as a monitor (or screen or display unit) that is connected to the user output interface. It will be appreciated that the computer architecture described above is merely exemplary and that other computer systems with different architectures (for example with fewer components or with additional or alternative components) may be used. As examples, the computer could comprise one or more of: a personal computer; a server computer; a laptop; etc.

Figure 3:
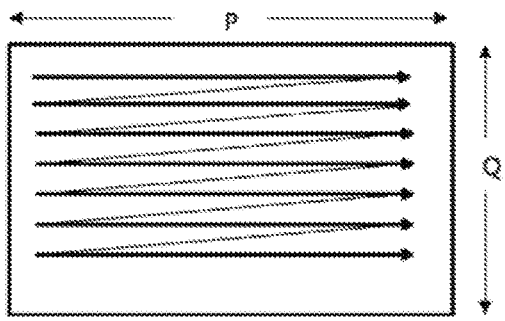
FIG. 3, FIG. 4, FIG. 5, FIG. 6 include illustrations of prior art scanning patterns and their associated array of ablation points.
Figure 4:
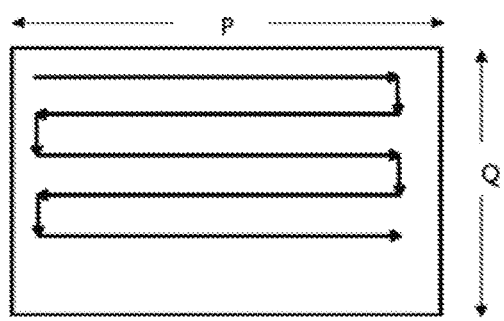
Figure 5:
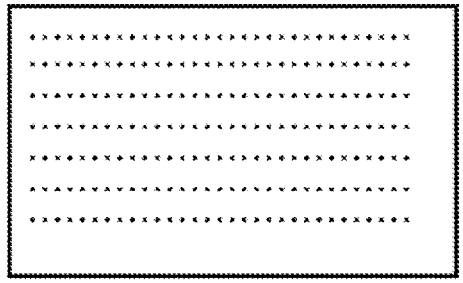
Figure 6:
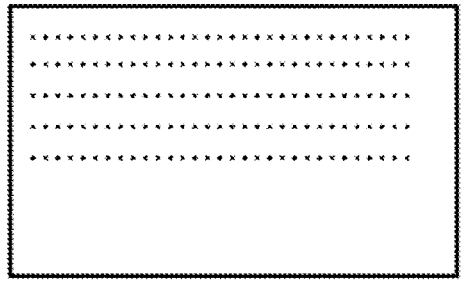

FIG. 3 and FIG. 4 illustrate conventional scanning patterns. For example, FIG. 3 illustrates a conventional raster scanning pattern. FIG. 4 illustrates a conventional snake scanning pattern. FIG. 5 and FIG. 6 illustrate a distribution of positions, such as a grid or array of positions, at which ablation is to take place for the conventional raster and snake scanning patterns. These conventional scanning patterns are based on dividing the image into horizontal strips, also known as scan lines. Each scan line can then be divided into a set of discrete ablation points, where each point represents the location of a single ablation. In the illustrated examples of FIG. 5 and FIG. 6, the positions are distributed at regular intervals. It has been discovered that such conventional scanning methods or patterns illustrated in FIG. 3 and FIG. 4 result in artifacts in positionally-resolved composition images and result in questionable average compositions when averaging across the grid or array of positions. As such, conventional scanning methods problematically introduce errors into measurements of evenly distributed positions on the surface of a sample, particularly when the scanning pattern causes the laser to scan mainly in a single direction. Another problem can arise from sampling of the surface beyond the boundaries of the area under investigation at the end of each scan line that is caused by the inertial properties of either the galvos or the linear stage as the galvos or the linear stages cannot be abruptly stopped and can move beyond the end of each scan line.

In contrast, it has been discovered that scanning along a fractal path to move the ablation point sequentially to positions along the fractal path permits collection of emission spectrum free of the artifacts associated with conventional scanning methods. For example, a fractal path can be derived from a fractal pattern.

A fractal pattern is a curve exhibiting self-similar characteristics, in which each part of the curve has the same statistical character as the whole. As used herein, fractal patterns are self-similar geometric shapes in which a fractal dimension exceeds a topological dimension. The fractal pattern is a curve or set of line segments having a topological dimension. In a particular example, the factal pattern has a discontinuous first derivative. In an example, the topological dimension for a line or curve is 1. The fractal dimension or Hausdorff dimension is defined as $\log(N)/\log(S)$ in which N stands for the number of new segments and S stands for the scaling factor. The fractal pattern has fractal dimension or Hausdorff dimension greater than 1 and not greater than 2. For example, the fractal pattern can have a Hausdorff dimension of at least 1.5, such as at least 1.9. In particular, the fractal pattern can have a Hausdorff dimension of 2, referred to herein as a curve-filling fractal pattern. Further, the fractal pattern can have a bounded fractal dimension, determined numerically, of at least 1.5 and not greater than 2. For example, the bounded fractal dimension can be at least 1.9, such as 2.

Example fractal patterns include a Julia, Fibonacci word, Triflake, Koch curve, Vicsek, Quadratic von Koch, quadratic cross, dragon curve, twin dragon curve, Sierpenski triangles, Sierpenski hexagon, hexaflake, H, pentaflake, Penrose tiling, Sierpenski curve, Hilbert curve, Peano curve, Moore curve, Lebesque curve, Gosper curve, or Greek cross fractal, or the like, or combinations thereof. In an example, the fractal pattern is a Penrose tiling, Sierpenski curve, Hilbert, Peano, Moore, Lebesque curve, Gosper curve, or Greek cross fractal, or the like, or combinations thereof. In particular, the fractal pattern is a Hilbert, Moore, or Peano fractal, or combinations thereof. For example, the fractal pattern has a Hausdorff dimension of 2 and a bounded fractal dimension of 2. Example fractal patterns having a Hausdorff dimension of 2 and a bounded fractal dimension of 2 include Hilbert, Moore, or Peano fractals, or combinations thereof.

Useful fractal patterns include fractal patterns that sequentially connect positions within an evenly distributed grid or array of positions, referred to herein as an isotropic curve-filling fractal pattern. Such fractal patterns can therefore generate an isotropic array of points spanning the area of the sample surface under investigation. Curve-filling fractal patterns have a Hausdorff dimension of 2. Isotropic curve-filling fractal patterns have a Hausdorff dimension of 2 and a bounded fractal dimension of 2. Examples of isotropic curve filling fractal patterns include Hilbert, Moore, or Peano fractals, or combinations thereof. As an example, the isotropic curve filling fractal patterns fill a two-dimensional unit square.

Figure 7:
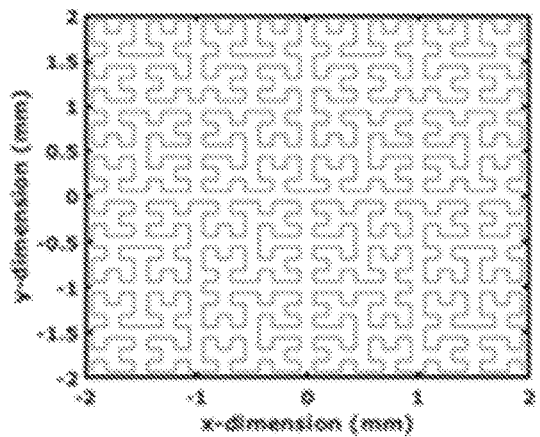
FIG. 7, FIG. 8, FIG. 9, and FIG. 10 include example fractal pathways and their associated array of ablation points.
Figure 8:
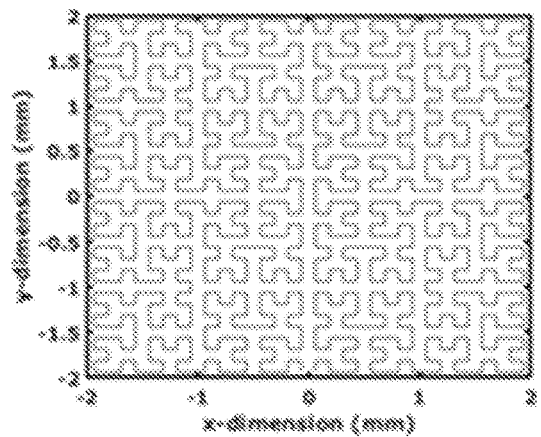
Figure 9:
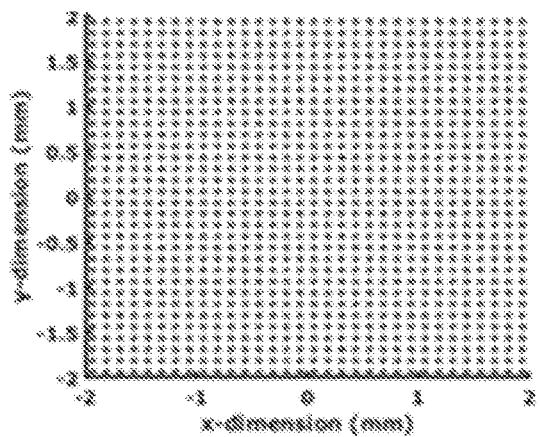
Figure 10:
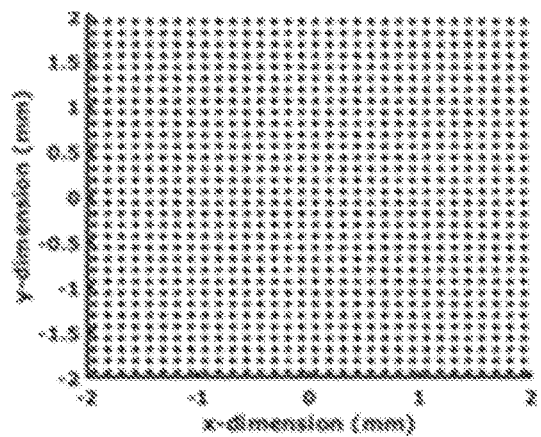

For example, FIG. 7 illustrates an example Hilbert fractal pattern, and FIG. 8 illustrates an example Moore fractal pattern. Such fractal patterns can be used to derive a fractal path that sequentially traverses through positions in an evenly distributed grid or array of positions, such as the grids or arrays illustrated in FIG. 9 and FIG. 10. FIG. 9 illustrates an evenly distributed grid or array of positions that can be traversed by a fractal path derived from the Hilbert fractal pattern illustrated in FIG. 7. FIG. 10 illustrates an evenly distributed grid or array of positions that can be traversed by fractal path derived from a Moore fractal pattern illustrated in FIG. 8. By sampling at such evenly distributed grid or array positions, the system can derive positionally-resolved maps indicative of composition or can derive an average composition utilizing measurements taken evenly across the sample area.

Figure 11:
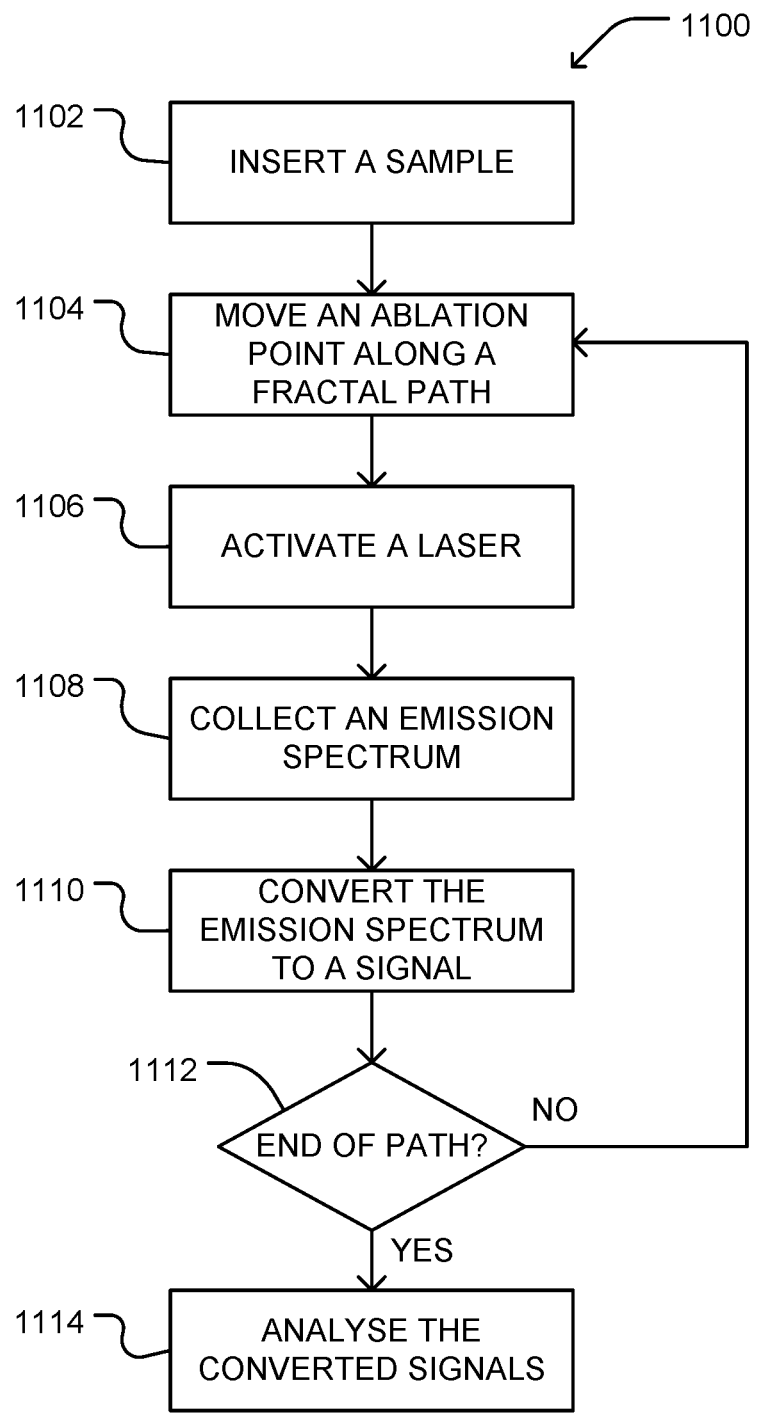
FIG. 11 includes a block flow diagram illustrating an example method for laser-induced breakdown spectroscopy.

FIG. 11 includes an illustration of an example method 1100 for performing compositional analysis. For example, the method includes inserting a sample into compositional analysis system, as illustrated at block 1102. In general, the sample has a surface at which material it to be ablated to evolve an emission spectrum that can be used for compositional analysis.

As illustrated at block 1104, the system can move an ablation point to sequential positions along a fractal path. The ablation point can be positioned in various positions along the fractal path. The positions can form a grid or array of positions on the surface of the sample.

At select intervals, the energy source, such as a laser, can be activated, as illustrated at block 1106. For example, the laser can be activated at a rate in a range of 1 Hz to several MHz, such as 100 Hz to 1000 Hz. When activated, material is ablated from the surface at the ablation point, facilitating the evolution of an emission spectrum.

The ablation point can be moved sequentially between positions along the fractal path by moving the sample relative to the fixed electromagnetic energy beam, for example, with a linear stage platform. In another example, the ablation point can be moved by changing the path of an energy beam relative to a fixed sample surface, such as through the use of the adjustable or movable lenses, prisms, or mirrors, e.g., galvo mirrors.

As illustrated at block 1108, the emission spectrum can be collected. For example, an optical system, such as a set of collection lenses can be used to collect an emission spectrum emanating from the ablation point. The emission spectrum can be provided optically to a spectrometer that collects and converts the emission spectrum into a digital signal, as illustrated at block 1110. The digital signal can indicate intensities of light received at various wavelengths, which can be used to determine the composition.

As illustrated in block 1112, the system determines whether the end of the fractal path has been reached. If not, the system moves the ablation point to a subsequent position along the fractal path, as illustrated at block 1104, activates the energy source, collects an emission spectrum, and converts the emission spectrum to a signal.

As illustrated at block 1114, the system can analyze the converted or digital signals to determine composition qualitatively and optionally quantitatively. In an example, the analysis can be performed after the measurements are taken across each of the ablation points. Alternatively, analysis can be performed concurrently with the measurements of emission spectra. The analysis can result in an averaging of compositions across the positions along the fractal path. In another example, analysis can provide a positionally-resolved image or map indicative of composition at various positions at the surface of the sample. Analysis may be performed by a computer associated with the spectrometer. In some embodiments, the computer for performing analysis may be the computer of the controller 222 in FIG. 2 described above.

Figure 12:
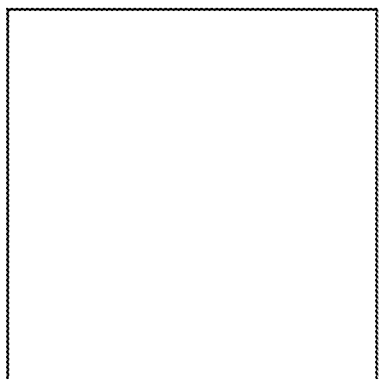
FIG. 12, FIG. 13, FIG. 14, FIG. 15, FIG. 16, and FIG. 17 include illustrations of example fractal paths for use with the example systems and methods of FIG. 1, FIG. 2, and FIG. 11.
Figure 13:
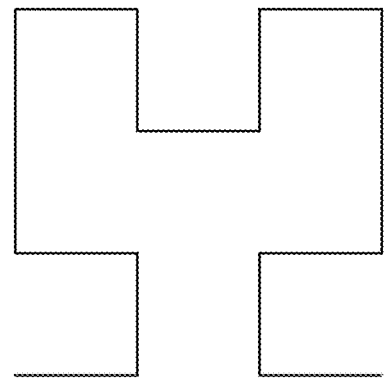
Figure 14:
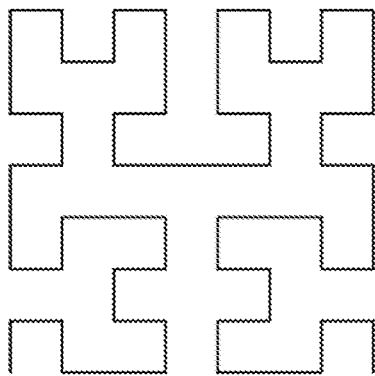
Figure 15:
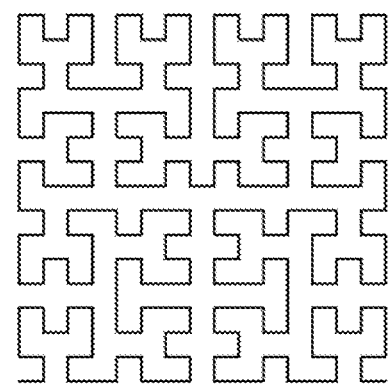
Figure 16:
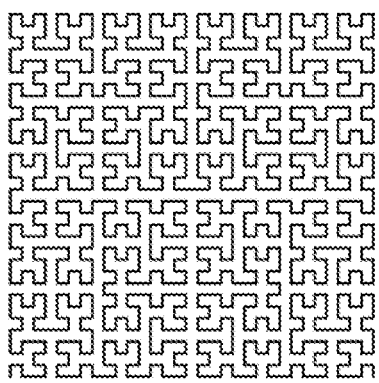
Figure 17:
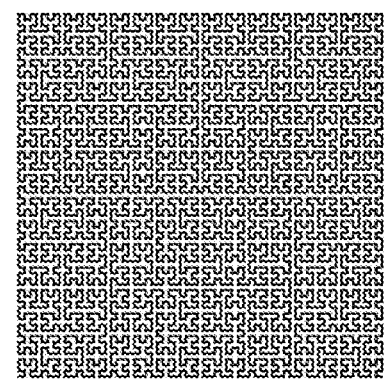

Depending upon the nature of the desired analysis, the resolution of an image indicative of composition, or other factors, the number of measurement positions or the density of measurement positions across a select sample area can be adjusted. The nature of fractals allows the adjustment of density or number of measurement positions by altering the iteration of the fractal pattern from which the fractal path is derived. For example, FIG. 12, FIG. 13, FIG. 14, FIG. 15, FIG. 16, and FIG. 17 illustrate different iterations of the Hilbert fractal pattern. In each iteration, the self-similar geometric pattern becomes more intricate and the number of measurement points traversed by a path extending through the pattern increases by a factor of four. For example, as illustrated in FIG. 12, a first iteration of the Hilbert pattern allows for four measurement points. A second iteration of the Hilbert fractal pattern illustrated in FIG. 13 extends through 16 measurement positions. Thus, both the number of measurement positions increases and the density across a given bounded area increases. Further, the third iteration of the Hilbert fractal pattern illustrated in FIG. 14 provides 64 point measurement points; a fourth iteration of the Hilbert fractal pattern illustrated in FIG. 15 provides 256 measurement points; a fifth iteration illustrated in FIG. 16 provides 1024 measurement points; and a six iteration illustrated in FIG. 17 provides 4096 measurement points. The process can continue, for example, a seven iteration of the Hilbert fractal pattern provides 16384 ($4^7$) measurement points, and an eighth iteration of the Hilbert fractal pattern provides 65536 ($4^8$) measurement points. In an example, the iteration number of the fractal pattern is in a range of 3 to 12, such as a range of 4 to 8, or 5 to 7.

With each iteration, the number of vertices or angled points at which the direction changes increases. A significant number of the measurement points lie on the vertices of the fractal pattern. For example, at least 40% of the measurement points lie on the vertices of the fractal pattern. In another example, at least 50% of the measurement points lie on the vertices of the fractal pattern, such as at least 60% of the measurement points, or such as at least 70% of the measurement points. In this way, a significant proportion of the sequential movements of the ablation point on the surface are not in the same direction, which contrasts with conventional scanning patterns such as the raster or snake patterns shown in FIG. 3 and FIG. 4.

Further, there are limited segments in which a sequential set of measurement points along the fractal path lie on the same line segment. For example, the fractal path derived from the fractal pattern may include no line segments in which more than five sequential measurement points along the fractal path lie in the same line segment. In a further example, the fractal path may be free of line segments that include more than four sequential measurement points.

Figure 18:
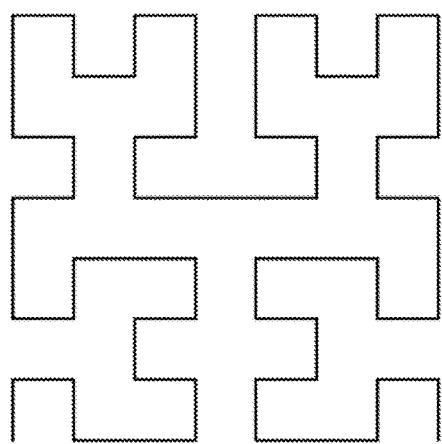
FIG. 18 and FIG. 19 include illustrations of example fractal paths.

In general, the measurement points can be distributed in a grid or array in which points are equidistant in both axial directions. For example, as illustrated in FIG. 18, each step in an X-direction has the same length as a step in the Y1-direction. FIG. 18 illustrates a third iteration of the Hilbert fractal pattern.

Figure 19:
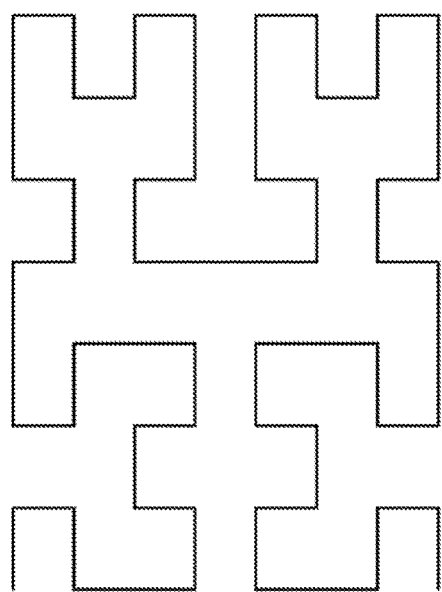

Alternatively, the step size in one dimension can have a different scale relative to the step size in a different dimension. For example, FIG. 19 illustrates a modified third iteration of the Hilbert fractal pattern in which step sizes in the Y2-direction are greater than the step sizes in the X-direction. Such scaling of step sizes in one or both directions can permit samplings of test areas that are not perpendicular with respect to the incoming radiation. For example, if a sample with the conic, triangular or prism-like surface is analyzed, to correctly create an isotropic grid onto the sample's surface, either the X, or Y, or both dimensions will have to be adjusted according to the slope of the sample's surface. This can be done by means of basic trigonometric calculations, in which $x'=x/\cos(\alpha)$ or $y'=y/\cos(\beta)$, where $\alpha$ and $\beta$ are the angles between the surface of the sample to be analyzed and the horizontal plane perpendicular to the incoming radiation.

Figure 20:
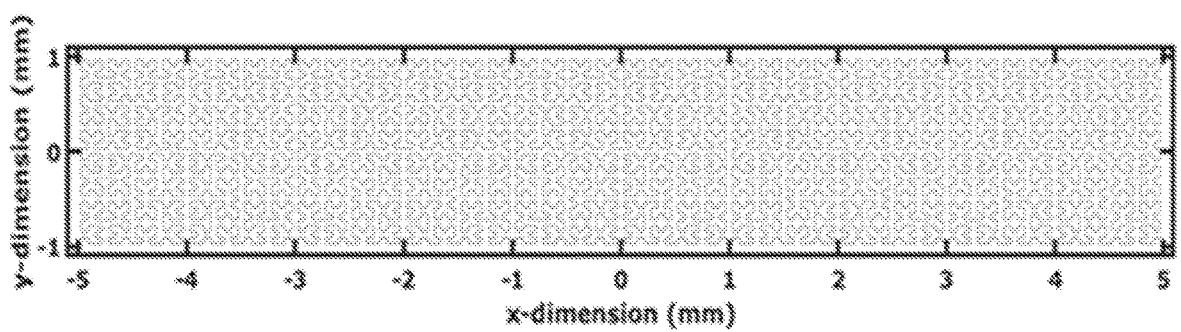
FIG. 20 includes an example concatenated fractal geometry to cover a test area.

In another example, illustrated in FIG. 20, a set of fractal patterns can be concatenated to form a fractal path that extends across a larger test area. In the example illustrated in FIG. 20, a set of five Hilbert fractal patterns are concatenated providing a continuous fractal path from one end of the rectangular test area to the other end of the test area. In a further example, a mirror image of the five Hilbert fractal patterns could be concatenated below the set of five illustrated in FIG. 20, forming a continuous fractal path through a larger test area.

Different shapes of test areas can be covered using more or fewer fractal patterns concatenated in a manner that provides a continuous fractal path across the test area. FIG. 20 illustrates the use of a set of Hilbert fractal patterns concatenated to form a fractal path. Other fractal patterns or sets, including the same or different fractal patterns, can be utilized and concatenated together to form a continuous fractal path through an irregular shaped test area. For example, sets including one or more of Hilbert fractal patterns, Moore fractal patterns, or Peano fractal patterns, or combinations thereof, can be concatenated together to form various test area shapes and to form a continuous fractal path through the various test area shapes.

Fractal paths can further be used to test the same area at different depths. For example, the same positions, such as within a grid or array of positions, can be tested more than once to reach subsurface depths. A first fractal pattern scan by the laser analyses the surface of the sample and each successive fractal pattern scan etches into the sample to an additional depth. By continuing this process, multiple layers can be analysed as a function of depth. By assembling the analyses of these layers in three dimensions, the system can produce a three dimensional map, that is, the composition of the sample can be analysed in three dimensions. In an example, FIG. 21 includes an illustration utilizing a fractal pattern to generate a fractal path over the same test area to test composition as a function of depth. In the illustrated example, a surface analysis is performed at test (1) using a first fractal path through the array of test positions. Additional fractal paths can be used at each of the tests (2), (3), or (4), etc., to test composition at etch depths 1, 2, or 3, etc. In the example illustrated in FIG. 21, a Hilbert fractal pattern is used to define a fractal path through a grid or array of measurement points. The same fractal path can be used in each of the subsequent tests (2), (3), or (4) to test composition at different depths at the same test points. In an alternative example, a different fractal pattern can be utilized at one or more of the additional tests, providing that the fractal pattern defines a fractal path through the same array of measurement positions. For example, the first test may utilize a Hilbert fractal pattern to define the fractal path, while a subsequent test may utilize a Moore fractal path or Peano fractal path to test the array of positions. The scan direction of the laser along the fractal path is not critical and can be the same for each test depth 1, 2, 3 etc., or can be different between test depths. As one example, at a first test depth the laser moves along the fractal path in a first direction and at a second test depth the laser moves along the fractal path in a second or opposite direction, the laser moving through the same array of measurement positions regardless of the scan direction.

Generally, when a test area selected, a variety of geometries, fractal patterns, and iterations of fractal patterns can be utilized to define a fractal path across the test area. In particular, the geometries can include the concatenation of fractal patterns, adjustment of step size and different dimensions, or subsequent tracing across previously tested points to generate measurements of composition as a function of depth. Further, selecting an iteration of a given fractal pattern to be utilized over a portion of the test area defines the number or density of measurement positions within a grid or array within the portion of the test area.

Figure 22:
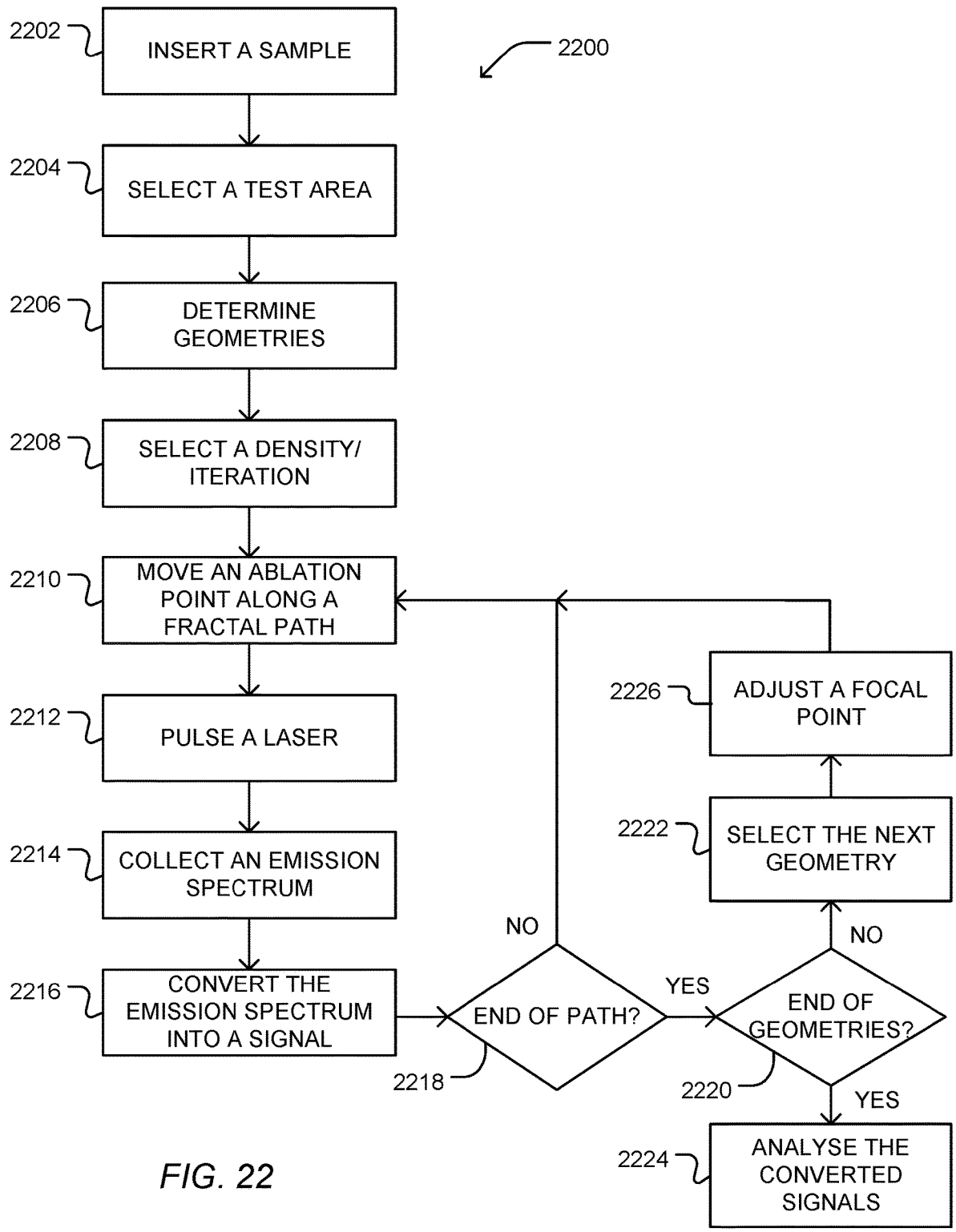
FIG. 22 includes a block flow diagram of an example method for performing laser-induced breakdown spectroscopy.

In an example illustrated in FIG. 22, a method 2200 for performing compositional analysis includes inserting a sample into the test system, as illustrated at block 2202. The sample includes a surface that is to be tested for composition. For example, the sample may be a metal, polymer, glass, ceramic, or mineral sample.

As illustrated at block 2204, a test area can be selected on the surface of the inserted sample. In an example, the test area is a square area. Alternatively, the test area can take a rectangular shape or another geometric shape.

Depending on the nature and shape of the test area, the system can determine the geometries to be utilized in defining a fractal path through the measurement positions defined within the test area, as illustrated at block 2206. For example, defining the geometries can include defining a concatenation of various fractal patterns, adjusting step sizes of a given fractal pattern, or selecting patterns over measurement positions that are been tested more than once.

The method can further include defining the density of a grid or array of measurement positions by selecting an iteration number of a fractal pattern that provides the desired density of the array of measurement positions, as illustrated at block 2208. Higher iteration numbers provide a greater number of measurement positions within an array and a higher density of measurement positions for a given area. Alternatively, a density can be selected and the system can determine an iteration number of a fractal pattern to use to achieve the selected density.

Once the geometries and iteration are selected, a fractal path is defined along which measurements can take place. For example, as illustrated at block 2210, an ablation point can be moved to sequential positions along the fractal path within a grid or array of measurement positions. At the desired position, an energy source, such as a laser, can be pulsed, as illustrated at block 2212. The pulse results in the ablation of material at the ablation point or position on the surface of the sample causing the evolution of emission spectrum.

As illustrated at block 2214, the emission spectrum can be collected, such as using a collection lens or other optical system. The collected emission spectrum can be converted to a digital signal, for example, utilizing a spectrometer, as illustrated at block 2216.

Following the collection of the emission spectrum, the system can determine whether the end of a fractal path along a select geometry has been reached, as illustrated at block 2218. If not, the system can move the ablation point to a subsequent position along the fractal path and repeat the pulsing of the laser and collection of emission spectrum.

If the end of the path is reached, the system can determine whether the end of the geometries has been reached, as illustrated at block 2220. For example, the system can determine whether all of the depths been tested or are there additional fractal patterns to be tested. If the end of the geometries is not reached, the system can then select the next geometry, as illustrated at block 2222.

Depending on the nature of the geometry, the system can reset the focal point of the energy source, such as the laser, as illustrated at block 2226. For example, when testing additional depths, the focal point can be adjusted for the next depth. The system can then move the ablation point along sequential positions in the fractal path, pulse the laser, and collect emission spectrum at each position.

The system can analyze the converted signals to determine composition, as illustrated at block 2224. For example, the system can average composition at the positions to determine an average across the surface test area. In another example, the system can provide positionally resolved maps or images indicating composition at position.

Embodiments of the above system and methods provide technical advantages over conventional systems. In particular, embodiments overcome the problem of a material transport effect observed in conventional systems and testing methods, reducing errors and the appearance of artifacts, such as blurring or smearing, in positionally-resolved maps indicating composition as a function of position. Such errors are also reduced when compositions collected from a set of positions are averaged. High accuracy is enabled in positionally-resolved maps as the galvo (or linear stage) movements are minimized.

EXAMPLES

Example 1

Figure 23:
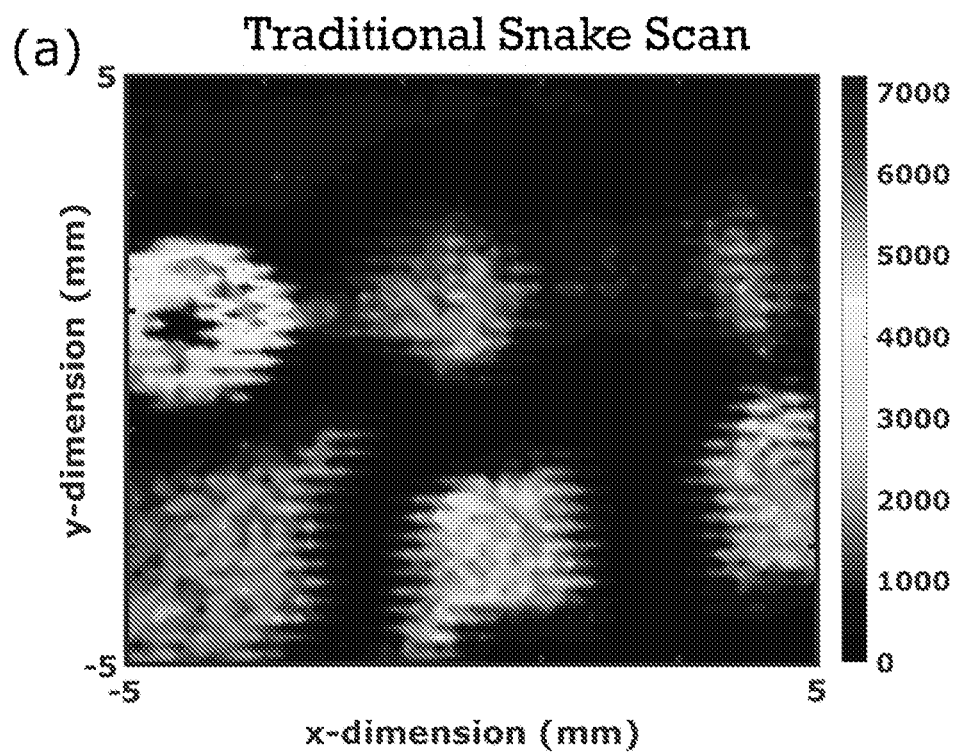
FIG. 23 and FIG. 24 include illustrations of example positionally-resolved compositional maps.
Figure 24:
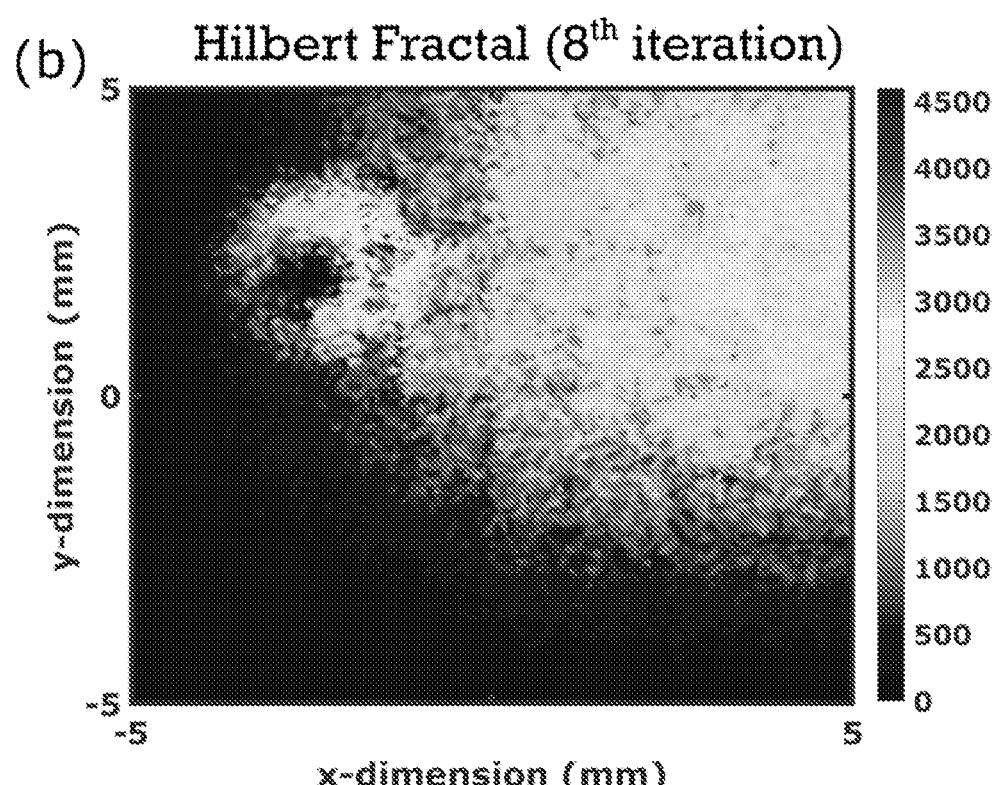

A printed circuit board (PCB) is tested for the presence of elemental nickel on a surface of the PCB. Different parts of the same PCB are tested using laser-induced breakdown spectroscopy utilizing different scanning patterns. A 532 nm laser with 2 mJ per pulse energy and a repetition rate of 1 kHz is used for each scanning pattern. The laser has 2 MW power per pulse and a beam width of 4 mm, providing 16 MW/cm$^2$. FIG. 23 illustrates a positionally-resolved map of composition measured utilizing conventional snake scan methods. FIG. 24 illustrates a positionally-resolved map of composition measured utilizing an 8th iteration Hilbert fractal pattern to define a fractal path through the test area.

As illustrated in FIG. 23, the snake scan method generates artifacts, such as smudges or additional traces or blurring effects. The snake scan utilizes a fast scanning in the X-direction using a one galvo mirror. A second galvo mirror is varied with one discrete step at the end of each row in the Y-dimension after a line has been scanned. The laser scan is therefore focused in a single direction, which causes strong material transportation effects as the laser scans over the sample surface.

In contrast, utilizing a fractal method, such as an 8$^{th}$ iteration Hilbert fractal pattern, provides an image that is more accurate and visually sharp. The speed of the scan is distributed in both the X and Y-directions in small convolutions, reducing the material transportation effects.

Example 2

Fractal patterns can be concatenated to cover test areas that are not square. A rectangle test area is scanned using a fractal path derived from the concatenation of a set of Hilbert fractal patterns. A 532 nm laser with 2 mJ per pulse energy and a repetition rate of 1 kHz is used for each scanning pattern. The laser has 2 MW power per pulse and a beam width of 4 mm, providing 16 MW/cm$^2$.

Figure 25:
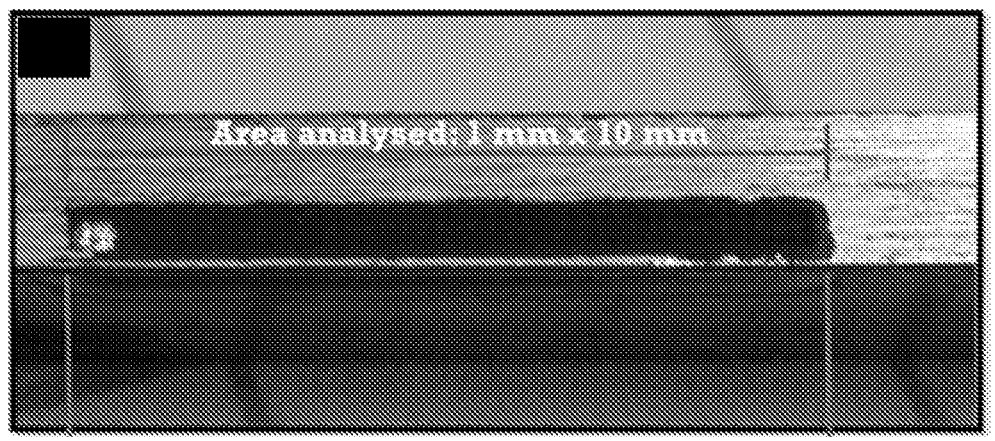
FIG. 25 includes an illustration of example test area on a rod.

A surface of a small steel bar (FIG. 25) is mapped using a fractal path derived from the concatenation of Hilbert fractal patterns (similar to the pattern illustrated in FIG. 20) to determine the relative intensity of the elements zinc and oxygen. In this case, the mapping has been conducted with a 10-fold concatenated 6th iteration Hilbert cell. This corresponds to a total of 40,960 points (10 times $4^6$).

Figure 26:
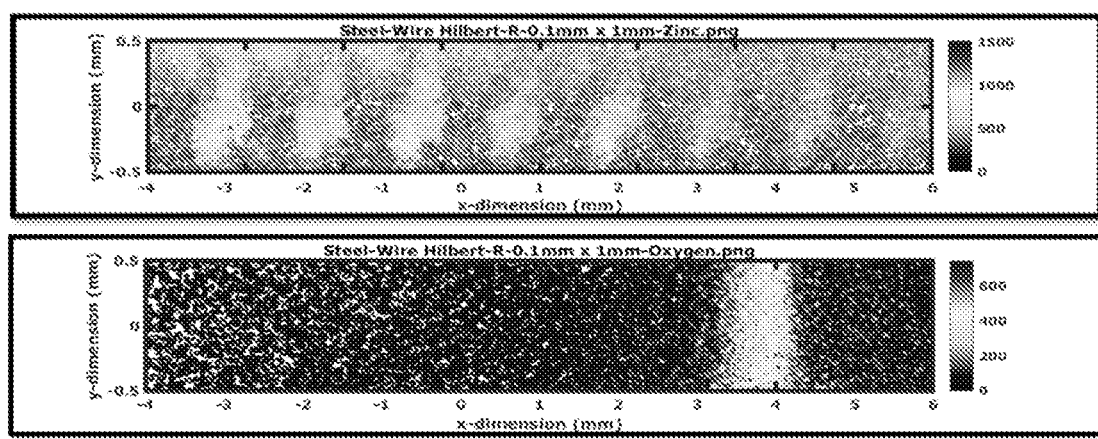
FIG. 26 includes an illustration of example images indicating positionally-resolved composition.

FIG. 26 illustrates maps indicative of composition for both zinc (top) and oxygen (bottom) utilizing a fractal path to test positions within the test area. Despite the longer x-dimension of the test area relative to the y-dimension, no material transportation artifacts are seen in the zinc and oxygen maps. The map of the zinc shows a regular pattern, which provides key information on the quality of the steel manufacturing process. The map of the oxygen reveals a localized, structural defect.

Example 3

Figure 21:
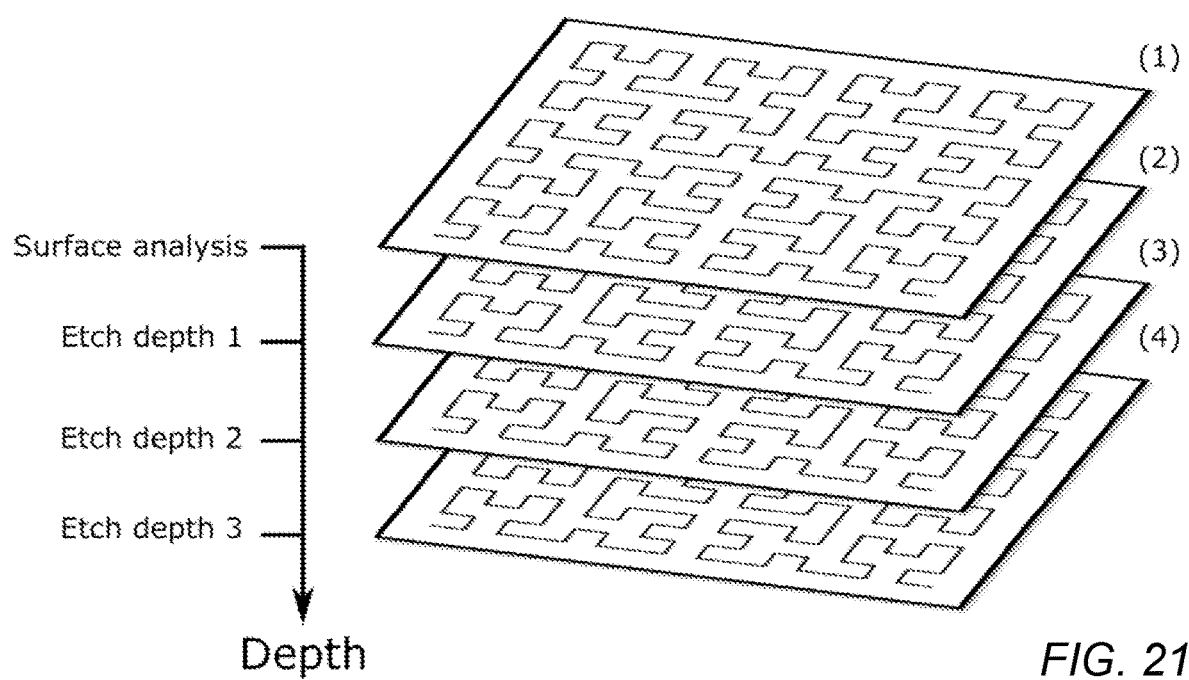
FIG. 21 includes an illustration of example fractal pathways to test composition at different depths.
Figure 27:
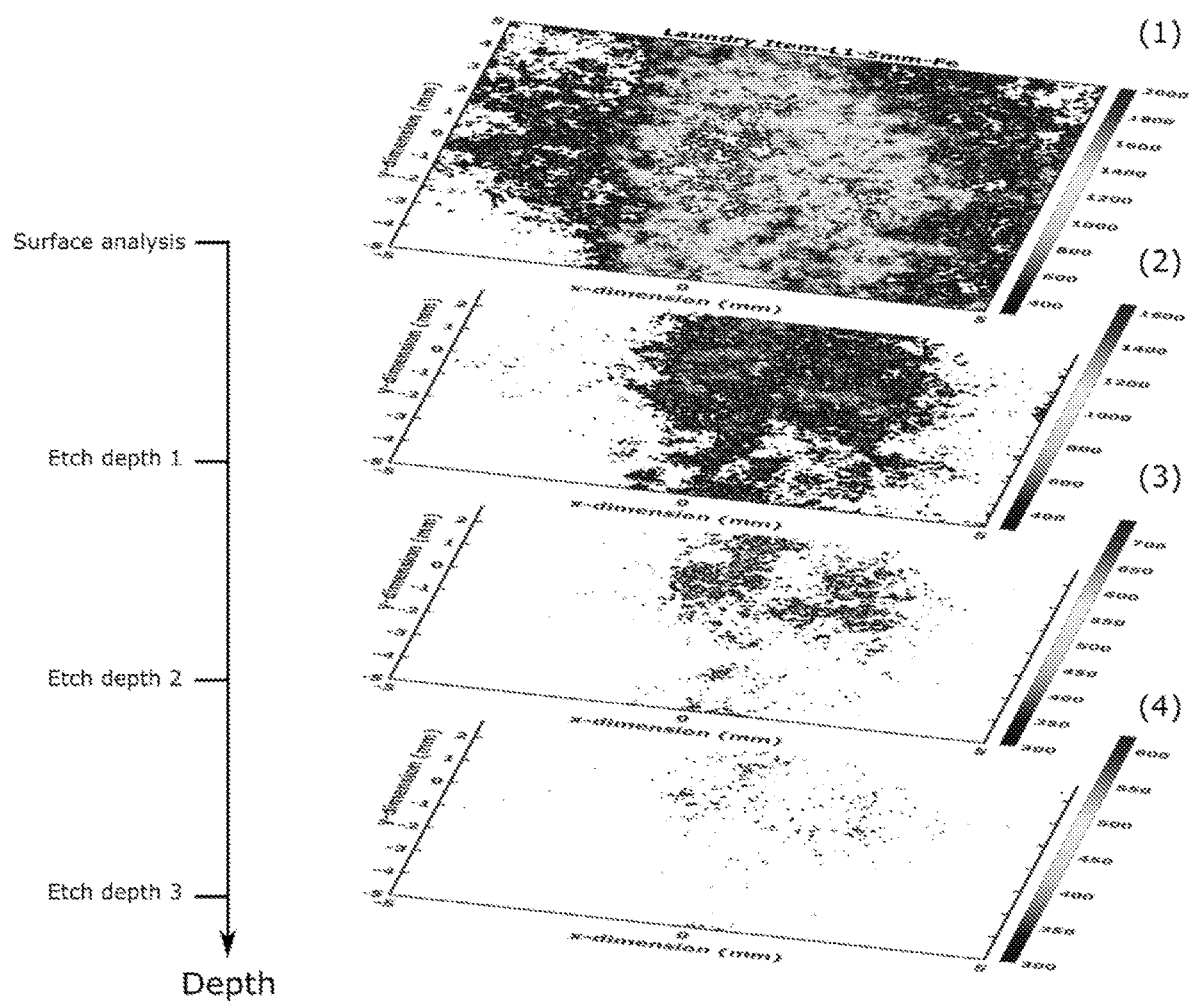
FIG. 27 includes an illustration of example positionally-resolved composition maps at different depths.

Compositions can be mapped in three dimensions by scanning the same area multiple times, etching one layer for each corresponding single pass scan over the test area, for example, as illustrated in FIG. 21, described above. As illustrated in FIG. 27, use of a fractal path repeatedly over the same area allows sampling at each point at different depths. To assess the depth of rust in a non-ferrous ceramic sample showing signs of rust, the element iron is tested at different etch depths and displayed on a relative intensity scale for each map. A 532 nm laser with 2 mJ per pulse energy and a repetition rate of 1 kHz is used for each scanning pattern. The laser has 2 MW power per pulse and a beam width of 4 mm, providing 16 MW/cm$^2$. The scan is performed four times (sampling the surface and three successive depths) over the same grid or array of positions using a fractal path derived from a Hilbert fractal pattern. Each layer corresponds to a map of 1 cm×1 cm area comprised of 65,536 ($4^8$) laser ablation points. This corresponds to a grid of 256×256 points, with a spatial resolution of approximately 400 µm.

As displayed in FIG. 27, the sample ceramic shows signs of cross-contamination at the surface with decreasing contamination at greater depths. The concentration of rust rapidly diminishes as a function of depth in the sample, indicating the rust is a superficial external contamination.

In a first embodiment, a method for compositional analysis includes providing a sample having a surface; moving an ablation point to a position of a plurality of positions on the surface along a fractal path; pulsing an energy source to provide an electromagnetic energy beam to ablate material at the ablation point; collecting an emission spectrum in response to pulsing the energy source; and analyzing the emission spectrum to determine a composition at the surface.

In an example of the first embodiment, the method further includes moving the ablation point to a second position on the surface along the fractal path. The second position is adjacent the first position along the fractal path.

In another example of the first embodiment and the above examples, moving the ablation point includes moving the sample using a translation plate.

In a further example of the first embodiment and the above examples, moving the ablation point includes positioning mirrors.

In an additional example of the first embodiment and the above examples, the energy source includes a laser.

In another example of the first embodiment and the above examples, collecting the emission spectrum includes collecting the emission spectrum with a charge-coupled device (CCD) imaging apparatus.

In a further example of the first embodiment and the above examples, the fractal path is defined by a curve-filling fractal pattern. For example, the curve-filling fractal pattern is an isotropic curve-filling fractal pattern.

In an additional example of the first embodiment and the above examples, the fractal path is derived from a Peano, Hilbert, or Moore fractal pattern.

In another example of the first embodiment and the above examples, the fractal path is derived from a fractal pattern having a Hausdorff dimension of greater than 1 and not greater than 2. For example, the Hausdorff dimension is at least 1.5. In an example, the Hausdorff dimension is 2.

In a further example of the first embodiment and the above examples, the fractal path is derived from a fractal pattern having a bounded fractal dimension of greater than 1.5 and not greater than 2. For example, the bounded fractal dimension is 2.

In an additional example of the first embodiment and the above examples, the fractal path is derived from a fractal pattern having an iteration number in a range of 3 and 12. For example, the iteration number is in a range of 4 to 8.

In another example of the first embodiment and the above examples, no more than five sequential positions along the fractal path are in the same linear segment. For example, no more than four sequential positions along the fractal path are in the same linear segment.

In a further example of the first embodiment and the above examples, at least 40% of the plurality of positions are disposed at vertices within the fractal path. For example, at least 50% of the plurality of positions are disposed at vertices within the fractal path. In an example, at least 60% of the plurality of positions are disposed at vertices within the fractal path.

In an additional example of the first embodiment and the above examples, the method further includes selecting a sampling density and determining an iteration number of the fractal based at least in part on the selected sampling density.

In another example of the first embodiment and the above examples, analyzing includes determining a composition at the position and averaging the composition with other compositions determined at other positions of the plurality of positions.

In a further example of the first embodiment and the above examples, analyzing includes determining a composition at the position and producing a positionally-resolved image including the composition displayed at a relative position with other compositions displayed at other relative positions.

In a second embodiment, a system includes an energy source to provide an energy beam; a positioning mechanism to position relatively a surface of a sample and the energy beam to provide an ablation point at a position of a plurality of positions on the surface; a collection lens directed to collect an emission spectrum from the ablation point; a spectrometer in optical communication with collection lens; and a controller in communication with the positioning mechanism, the controller to direct movement of the ablation point on the surface to the plurality of positions along a fractal path.

In an example of the second embodiment, the system further includes an F-theta lens in a path of the energy beam.

In another example of the second embodiment and the above examples, the positioning mechanism includes adjustable mirrors.

In a further example of the second embodiment and the above examples, the positioning mechanism includes a platform to translate the sample.

In an additional example of the second embodiment and the above examples, the energy source includes a laser.

In another example of the second embodiment and the above examples, the spectrometer includes a charge-coupled device (CCD) imaging apparatus.

In a further example of the second embodiment and the above examples, the fractal path is defined by a curve-filling fractal pattern. For example, the curve-filling fractal pattern is an isotropic curve-filling fractal pattern.

In an additional example of the second embodiment and the above examples, the fractal path is derived from a Peano, Hilbert, or Moore fractal pattern.

In another example of the second embodiment and the above examples, the fractal path is derived from a fractal pattern having a Hausdorff dimension of greater than 1 and not greater than 2. For example, the Hausdorff dimension is at least 1.5. In an example, the Hausdorff dimension is 2.

In a further example of the second embodiment and the above examples, the fractal path is derived from a fractal pattern having a bounded fractal dimension of greater than 1.5 and not greater than 2. For example, the bounded fractal dimension is 2.

In an additional example of the second embodiment and the above examples, the fractal path is derived from a fractal pattern having an iteration number in a range of 3 and 12. For example, the iteration number is in a range of 4 to 8.

In another example of the second embodiment and the above examples, no more than five sequential positions along the fractal path are in the same linear segment. For example, no more than four sequential positions along the fractal path are in the same linear segment.

In a further example of the second embodiment and the above examples, at least 40% of the plurality of positions are disposed at vertices within the fractal path. For example, at least 50% of the plurality of positions are disposed at vertices within the fractal path. In an example, at least 60% of the plurality of positions are disposed at vertices within the fractal path.

In a third embodiment, a method for compositional analysis includes providing a sample having a surface; at each position of a plurality of positions on the surface, ablating material from the surface at the each position using a laser system; collecting an emission spectrum with a collection device; and moving along a fractal path to a next position of the plurality of positions; and analyzing the collected emission spectrum to determine a composition.

In an example of the third embodiment, the method further includes selecting a test area on the surface, the plurality of positions disposed within the test area. For example, the method further includes defining a set of geometries within the test area on the surface, each geometry of the set of geometries defining a set of positions of the plurality of positions. In an example, a first geometry of the set of geometries is adjacent a second geometry of the set of geometries at a same depth along the surface. In a further example, a first geometry of the set of geometries is over a second geometry of the set of geometries at different depths at or below the surface. In an additional example, the method further includes, for each geometry of the set of geometries, adjusting a focal point of the laser system.

In another example of the third embodiment and the above examples, the method further includes selecting a sampling density and determining an iteration of a fractal pattern of the fractal path.

In a further example of the third embodiment and the above examples, the method further includes selecting an iteration number of a fractal pattern of the fractal path.

In an additional example of the third embodiment and the above examples, moving along the fractal path includes moving the sample using a translation plate.

In another example of the third embodiment and the above examples, moving along the fractal path includes positioning mirrors.

In a further example of the third embodiment and the above examples, the collection device includes a charge-couple device (CCD) imaging apparatus.

In an additional example of the third embodiment and the above examples, the fractal path is derived from a curve-filling fractal pattern. For example, the curve-filling fractal pattern is an isotropic curve-filling fractal pattern.

In another example of the third embodiment and the above examples, the fractal path is derived from a Peano, Hilbert, or Moore fractal pattern.

In a further example of the third embodiment and the above examples, the fractal path is derived from a fractal pattern having a Hausdorff dimension of greater than 1 and not greater than 2. For example, the Hausdorff dimension is at least 1.5. In an example, the Hausdorff dimension is 2.

In an additional example of the third embodiment and the above examples, the fractal path is derived from a fractal pattern having a bounded fractal dimension of greater than 1.5 and not greater than 2. For example, the bounded fractal dimension is 2.

In another example of the third embodiment and the above examples, the fractal path is derived from a fractal pattern having an iteration number in a range of 3 and 12. For example, the iteration number is in a range of 4 to 8.

In a further example of the third embodiment and the above examples, no more than five sequential positions of the plurality positions are in the same linear segment along the fractal path. For example, no more than four sequential positions of the plurality of positions are in the same linear segment along the fractal path.

In an additional example of the third embodiment and the above examples, at least 40% of the plurality of positions are disposed at vertices within the fractal path. For example, at least 50% of the plurality of positions are disposed at vertices within the fractal path. In an example, at least 60% of the plurality of positions are disposed at vertices within the fractal path.

In another example of the third embodiment and the above examples, analyzing includes determining the composition at the each position and averaging the composition with other compositions determined at other positions of the plurality of positions.

In a further example of the third embodiment and the above examples, analyzing includes determining the composition at the position and producing a positionally-resolved image including the composition displayed at a relative position with other compositions displayed at other relative positions.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for compositional analysis, the method comprising:
   providing a sample having a surface;
   moving an ablation point to a position of a plurality of positions on the surface along a fractal path, wherein the fractal path is defined by a self-similar geometric shape in which a fractal dimension exceeds a topological dimension;
   pulsing an energy source to provide an electromagnetic energy beam to ablate material at the ablation point;

collecting an emission spectrum in response to pulsing the energy source; and analyzing the emission spectrum to determine a composition at the surface.

2. The method of claim 1, further comprising moving the ablation point to a second position on the surface along the fractal path, the second position adjacent the first position along the fractal path.

3. The method of claim 1, wherein moving the ablation point includes moving the sample using a translation plate.

4. The method of claim 1, wherein moving the ablation point includes positioning mirrors.

5. The method of claim 1, wherein the energy source includes a laser.

6. The method of claim 1, wherein collecting the emission spectrum includes collecting the emission spectrum with a charge-coupled device (CCD) imaging apparatus.

7. The method of claim 1, wherein the fractal path is defined by a curve-filling fractal pattern.

8. The method of claim 1, wherein the fractal path is derived from a Peano, Hilbert, or Moore fractal pattern.

9. The method of claim 1, wherein the fractal path is derived from a fractal pattern having a Hausdorff dimension of greater than 1 and not greater than 2.

10. The method of claim 1, wherein the fractal path is derived from a fractal pattern having a bounded fractal dimension of greater than 1.5 and not greater than 2.

11. The method of claim 1, wherein the fractal path is derived from a fractal pattern having an iteration number in a range of 3 and 12.

12. The method of claim 1, wherein no more than five sequential positions along the fractal path are in the same linear segment.

13. The method of claim 1, wherein at least 40% of the plurality of positions are disposed at vertices within the fractal path.

14. The method of claim 1, further comprising selecting a sampling density and determining an iteration number of the fractal based at least in part on the selected sampling density.

15. The method of claim 1, wherein analyzing includes determining a composition at the position and averaging the composition with other compositions determined at other positions of the plurality of positions.

16. The method of claim 1, wherein analyzing includes determining a composition at the position and producing a positionally-resolved image including the composition displayed at a relative position with other compositions displayed at other relative positions.

17. A system comprising:

an energy source to provide an energy beam;

a positioning mechanism to position relatively a surface of a sample and the energy beam to provide an ablation point at a position of a plurality of positions on the surface;

a collection lens directed to collect an emission spectrum from the ablation point;

a spectrometer in optical communication with collection lens; and a controller in communication with the positioning mechanism, the controller to direct movement of the ablation point on the surface to the plurality of positions along a fractal path, wherein the fractal path is defined by a self-similar geometric shape in which a fractal dimension exceeds a topological dimension.

18. The system of claim 17, further comprising an F-theta lens in a path of the energy beam.

19. The system of claim 17, wherein the positioning mechanism includes adjustable mirrors.

20. The system of claim 17, wherein the fractal path is defined by a curve-filling fractal pattern.

* * * * *